Oct. 30, 1934.  L. H. DRAEGER  1,978,859
MEMBER FOR COUPLING VEHICLES TOGETHER
Filed July 22, 1933    2 Sheets-Sheet 1
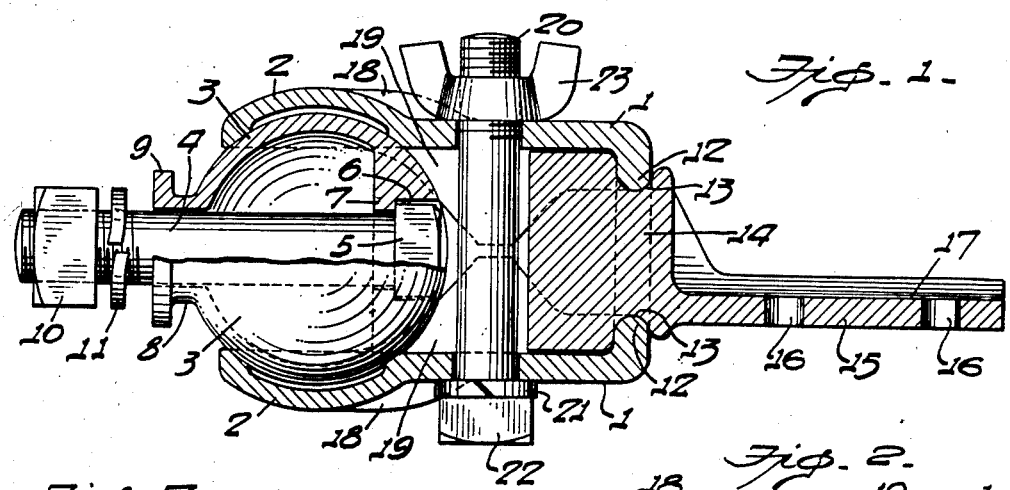
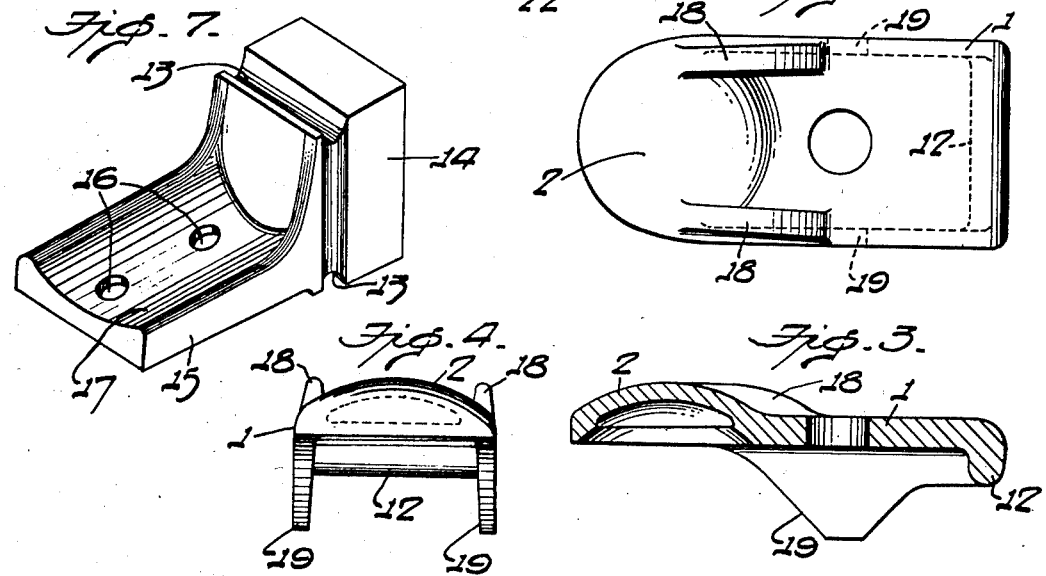
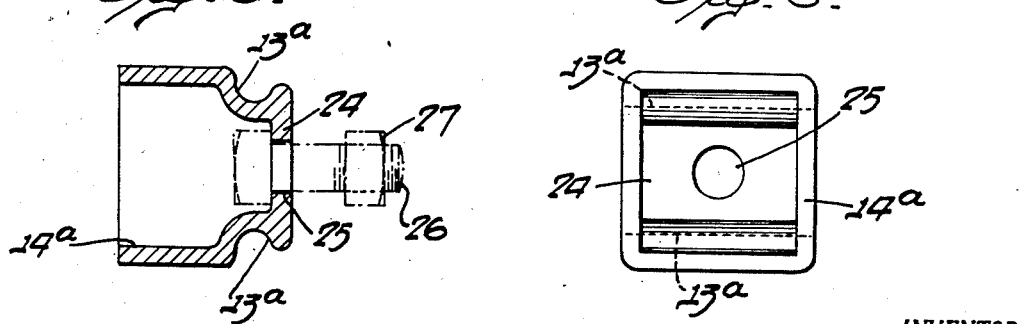
INVENTOR.
Lloyd H. Draeger
BY
ATTORNEY.

Oct. 30, 1934.    L. H. DRAEGER    1,978,859
MEMBER FOR COUPLING VEHICLES TOGETHER
Filed July 22, 1933    2 Sheets-Sheet 2

Fig. 8.

Fig. 9.

Inventor
Lloyd H. Draeger
By
Associate  Attorney

Patented Oct. 30, 1934

1,978,859

UNITED STATES PATENT OFFICE 1,978,859

MEMBER FOR COUPLING VEHICLES TOGETHER

Lloyd H. Draeger, Milwaukee, Wis.

Application July 22, 1933, Serial No. 681,787

6 Claims. (Cl. 280—33.15)

My invention relates to a coupling member for connecting a motor vehicle, say an automobile, or motor car, to a trailer or vehicle to be drawn by the motor car. It has for its objects to produce such a coupling member by which the two vehicles may be readily connected together and disconnected from each other when and as desired, and in which the coupling member will consist of the smallest number of parts for efficient operation, and possess the maximum strength, and may be constructed at relatively low cost.

To the accomplishment of the foregoing and such other objects as may hereinafter appear the invention consists in the features hereinafter particularly described and then sought to be clearly defined by the claims, reference being had to the accompanying drawings forming a part hereof, and in which:

Figure 1 is a side elevation, partly in section, of the coupling;

Figure 2, a plan view of one link of the coupling;

Figure 3, a longitudinal section through one of the links;

Figure 4, an end view of Figure 3;

Figure 5, a vertical section through a modified form of articulated head, and showing in dotted lines a bolt and nut for connection with the end of a car or vehicle;

Figure 6, an end view of the articulated head, of the form shown in Figure 5, looking inside the head and showing the cross-web through which the attaching bolt passes;

Figure 7, a perspective of the articulated head member having an end extension with a concave face to receive a draw-bar round in cross-section;

Figure 8, a view similar to Figure 1, showing a pole or round type of draw-bar for a trailer;

Figure 9, a side view of a modified position of the ball and clamping links of the coupling member.

In the drawings the coupling member is represented as comprising oppositely disposed links 1 each formed at one end with semi-spherical members 2 which together form a substantially spherical socket to receive a spherical ball 3, so that the socket and ball form a ball and socket universal joint. A bolt 4 extends through the ball 3 and is formed with a head 5 at one end which lies within a recess or socket 6 in a boss 7 inside the ball, and its other end extends through an opening in the opposite side of ball 3 which has an external neck 8 and terminal flange 9. The projecting end of the bolt 4 is threaded to receive a nut 10 by which it may be secured to a draw-bar or other part of a vehicle that will draw or be drawn by another vehicle with which the coupling member will connect. A split washer 11 may be mounted on the bolt 4 between nut 10 and flange 9 when connected up with a suitable part of the vehicle with which said parts cooperate.

The ends of links 1 opposite the ends having the semi-spherical cavities 2 are formed with inwardly projecting lugs 12 disposed to fit in grooves 13 formed in opposite faces of the head member 14 so that said head will be mounted in a jointed or articulated manner between the jaws at one end thereof. Grooves or cavities 13 may be made in the four faces of the head member 14 as shown, and the head member 14 in its preferred form may be made with an extension or shank 15 for attachment to one of the vehicles that are to be coupled together. The attachment may be made through any approved form of draw-bar, or a rod, extending from the trailer vehicle to be coupled. If it be by a substantially flat draw-bar, the under face of extension or shank 15 will be correspondingly flat as shown in Fig. 1, and Fig. 7, but if it be by a rod substantially circular in cross-section, then one face of extension or shank 15 receiving the rod will be concave, as indicated at 17 in Fig. 7 and Figs. 8 and 9, of the drawings. In either case the extension or shank 15 of the articulated member will be secured to the rod or draw-bar by one or more bolts 28, or other suitable means, passed through openings or holes 16 in the extension or shank 15 and also in the rod or draw-bar.

The links 1 are preferably formed on their external faces with reinforcing ribs 18, and on their inner faces with wings or flanges 19 so disposed that they lie at opposite faces of the sphere or ball 3 at one end of the coupling member and at opposite faces of the articulated-mounted head 14 at the other end of the member, as shown in Figs. 2 and 8 of the drawings.

The two links are held together, with the ball or sphere between them at one end and the articulated-mounted head between them at the opposite end, by a bolt 20 passed through both links with a split washer 21 between the head 22 of the bolt and face of the link, the bolt at its opposite end being provided with suitable tightening means, for example, preferably a thumb-nut 23, by which the links will be drawn toward each other, with the sphere or ball of the ball and socket joint fitting in the sockets, and lugs 12 at the opposite ends of the links fitting and held in the grooves of the articulated-mounted member or head at that end of the coupling member.

Thus a strong and compact coupling member, formed of few parts and produced at comparatively small cost, is provided for coupling together two vehicles, one of which may be motor driven, and the other serving as a trailer to be drawn or pushed, as the coupling member has the capacity to serve either as a draw-bar or push-bar, and may be used with equal facility, even under endwise reversal of its position to meet conditions existing in the two vehicles to be coupled together.

In Fig. 1 of the drawings the articulated-mounted member 14 is illustrated as solid, while in Figs. 5 and 6 it is shown as hollow and indicated by the numeral 14a, and is formed with recesses or grooves 13a corresponding to grooves 13 of the solid head, to receive lugs corresponding to lugs 12 in the other form, and is also formed with a web 24 at one end, having a hole 25 for the passage of a bolt 26 whose head will abut the web 24, by which it may be secured to a draw-bar or other member forming a part of the vehicle to be coupled.

In Figures 8 and 9 the draw-bar of the trailer is illustrated as round in cross-section, and is seated in the concave face of extension 15 and secured by bolts or equivalent means 28. In Figure 8 the bolt 4 of the universal joint end of the coupling is shown as passed through a bracket or bar 29a secured to any suitable part of the motor driven vehicle, and functioning as a draw-bar to that vehicle. The elements shown in Figure 8 correspond to and operate substantially the same as corresponding parts illustrated in Figure 1 of the drawings. In Figure 9 the numeral 19a represents a bracket or bar extending from the rear of a motor driven vehicle, and in its function corresponds to a draw-bar extending to the rear of a motor driven vehicle and to which will be attached one end of the coupling member by which the motor driven vehicle will be connected with the trailer or vehicle that is to be drawn. It will be observed that in Figure 9 of the drawings the ball 3 of the ball and socket end of the coupling member extends substantially at right angles, or ninety degrees to the position of the ball 3 illustrated in Figure 8, but that under both forms the ball 3 and the draw-bar at the articulated-mounted head of the coupling member are in substantial alinement one with the other. This is provided for by unscrewing the wing nut 23 on the clamping bolt 20 so that the two links 1 will be sufficiently loosened to swing approximately twenty degrees to the position shown in Figure 8 which will bring the lugs 12 at the ends of the links into the grooves 13 that are in opposite sides of the articulated-mounted head, and then screwing up the nut 23 on bolt 20 so as to draw the two links, one towards the other, and clamp the parts together in the relationship shown in Figure 9.

It will thus be observed that the novel coupling member is adapted to be applied to draw-bars of different formation, according as one form of draw-bar or another form may be a part of the vehicles to be coupled together without a new draw-bar for either vehicle. By this construction of coupling member for hitching two vehicles together the coupling also serves as a distance spacer between the two vehicles, and by providing a universal joint at one end of the coupling member and an articulated member or head at the other end, the universal joint and articulated head are kept in substantial alinement with each other, and the line of draft will be substantially through the longitudinal axis of both of said members, and the trailer vehicle will follow the other vehicle without rattling, or shimmying, or weaving, and the vehicles will yield to unevenness of the road and also turn corners without straining or twisting the metal parts. The bolt and nut for clamping the parts of the coupling member together also serve to take up slack due to wear; and when the trailer is uncoupled, the wing nut may be screwed up on its bolt so as to hold the retained parts together and prevent their accidental displacement.

I have illustrated and described with particularity the preferred details of the several elements and their assemblage, but changes may be made therein without departing from the essential features as sought to be defined by the appended claims.

Having described my invention and set forth its merits, what I claim is:

1. A vehicle coupling member including a pair of links formed with semi-spherical cavities at one end and with inwardly projected lugs at the opposite ends, a spherical member fitted in the semi-spherical cavities at one end of the links, an articulated-mounted head member fitted and confined between the links, and formed with cavities to receive the lugs of the links, means for drawing the links towards each other to secure the spherical member and the articulated-mounted member in place, and means for attaching the coupling member at its opposite ends to a vehicle.

2. A vehicle coupling member comprising a spherical member at one end and an articulated-mounted head at the other end, links formed with cavities at one end to receive the spherical member and with inwardly extending lugs at the other end to fit cavities in the articulated-mounted head, and means for holding the links, with the spherical member and articulated-mounted head confined between the links.

3. A vehicle coupling member comprising a spherical member at one end and an articulated-mounted head at the other end, links formed at one end with cavities to receive the spherical member to constitute a universal joint and with inwardly extending lugs at the other end to cooperate with the articulated-mounted head, said head having cavities formed in opposite faces to receive the inwardly extending lugs of the links, and formed with an outwardly extending member for attachment to a part of a vehicle, the spherical member at the opposite ends of the links being provided with a member for attachment to a part of a vehicle, and means for securing together the links, the spherical member and the articulated-mounted head.

4. A vehicle coupling member comprising a spherical member at one end and an articulated-mounted head at the other end, oppositely disposed links, each link formed at one end with a cavity to receive the spherical member and at the opposite end with an inwardly extending lug to fit in a cavity formed in the articulated-mounted head, flanges extending inwardly from the links to lie at opposite faces of the spherical member and the articulated-mounted head, a bolt adjustably connecting the oppositely disposed links, and means at opposite ends of the coupling member for attachment to vehicles to be connected together by the coupling member.

5. A vehicle coupling member comprising a pair of links formed at one end to receive a spherical member to constitute a universal joint and at the opposite end formed to receive an articulated head having a member extending therefrom for attachment to a vehicle, a rod extending through the spherical member and formed with a head fitting in a socket in said member and having its opposite end extended through one side of the spherical member, means for attachment of the coupling at opposite ends to a vehicle, and means for securing the links, spherical member and articulated-mounted head in assembled relation.

6. A vehicle coupling member comprising a pair of links provided at one end with a universal joint and at the opposite end with an articulated-mounted head formed with depressions to receive gripping lugs formed at the adjacent ends of the links, a bolt passed between the universal joint and articulated-mounted head, and means cooperating with the bolt for drawing one link towards the other to clamp the several parts in cooperative relation.

LLOYD H. DRAEGER.